United States Patent [19]

Hall

[11] Patent Number: 4,719,752
[45] Date of Patent: Jan. 19, 1988

[54] EXHAUST PIPE SYSTEM

[75] Inventor: Andrew W. Hall, Uddingston, Great Britain

[73] Assignee: General Motors Corporation, Detroit, Mich.

[21] Appl. No.: 909,000

[22] Filed: Sep. 18, 1986

[30] Foreign Application Priority Data

Sep. 20, 1985 [GB] United Kingdom ............... 8523308

[51] Int. Cl.⁴ .................... F01N 7/00; F16L 35/00
[52] U.S. Cl. ............................. 60/322; 180/309; 280/421; 285/1
[58] Field of Search .............. 60/322; 280/420, 421; 180/309; 285/1, 2

[56] References Cited

U.S. PATENT DOCUMENTS

| | | | |
|---|---|---|---|
| 152,413 | 6/1874 | Rhinehart | 285/1 |
| 426,824 | 4/1890 | Leland | 285/1 |
| 930,933 | 8/1909 | Brodie | 285/1 |
| 2,502,753 | 4/1950 | Rohr | 285/41 |
| 2,533,640 | 12/1950 | Ulrich | 285/1 |
| 3,152,815 | 10/1964 | Barragato | 285/1 |
| 4,074,525 | 2/1978 | LeSalver | 698/505 |
| 4,339,919 | 7/1982 | Jobling et al. | 60/322 |
| 4,392,513 | 7/1983 | Parrish | 285/1 |

FOREIGN PATENT DOCUMENTS

| | | |
|---|---|---|
| 502279 | 1/1938 | United Kingdom . |
| 530038 | 7/1939 | United Kingdom . |
| 715160 | 4/1952 | United Kingdom . |
| 761017 | 9/1955 | United Kingdom . |
| 1113298 | 7/1986 | United Kingdom . |

*Primary Examiner*—Douglas Hart
*Attorney, Agent, or Firm*—R. L. Phillips

[57] ABSTRACT

An exhaust pipe system for an articulated motor vehicle comprising at least a first part and a second part, the first and second parts being pivotable relative to one another, the exhaust pipe system comprising a first rigid portion securable to the first part of the vehicle; a second rigid portion securable to the second part of the vehicle; and an intermediate flexible portion connected at its ends to the rigid portions, the flexible portion comprising a coupling comprising two parts which are releasably secured together by fastening means to provide a substantially gas-tight seal between the two parts of the coupling, the fastening means being such that, when the two parts of the coupling are subjected to a force, relative to one another, above a predetermined level, the fastening means is released allowing the two parts of the coupling to separate from one another without damaging any of the exhaust pipe system.

6 Claims, 9 Drawing Figures

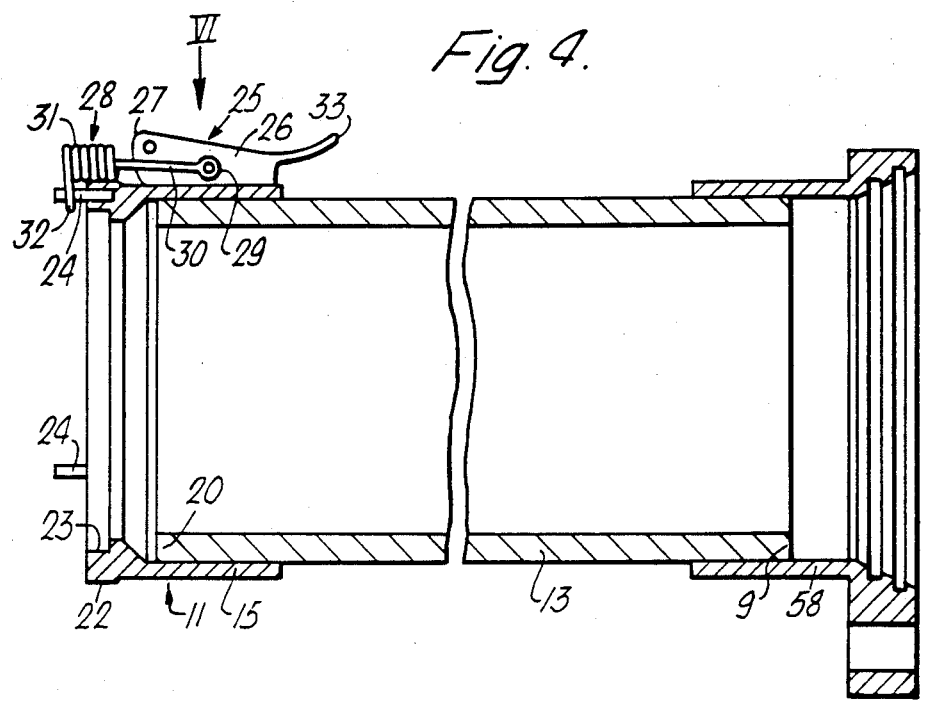
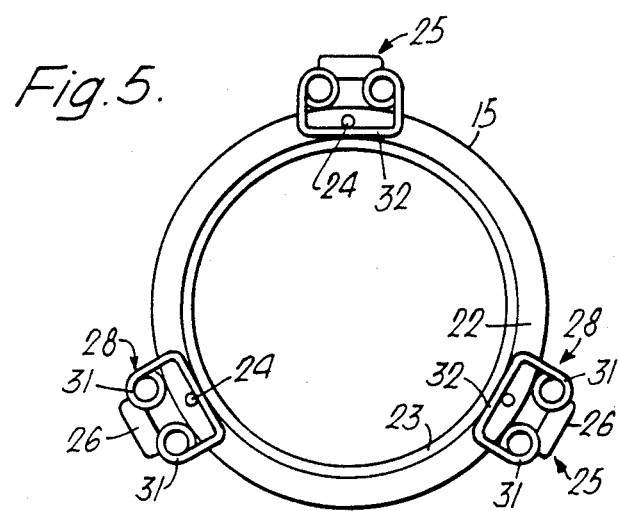

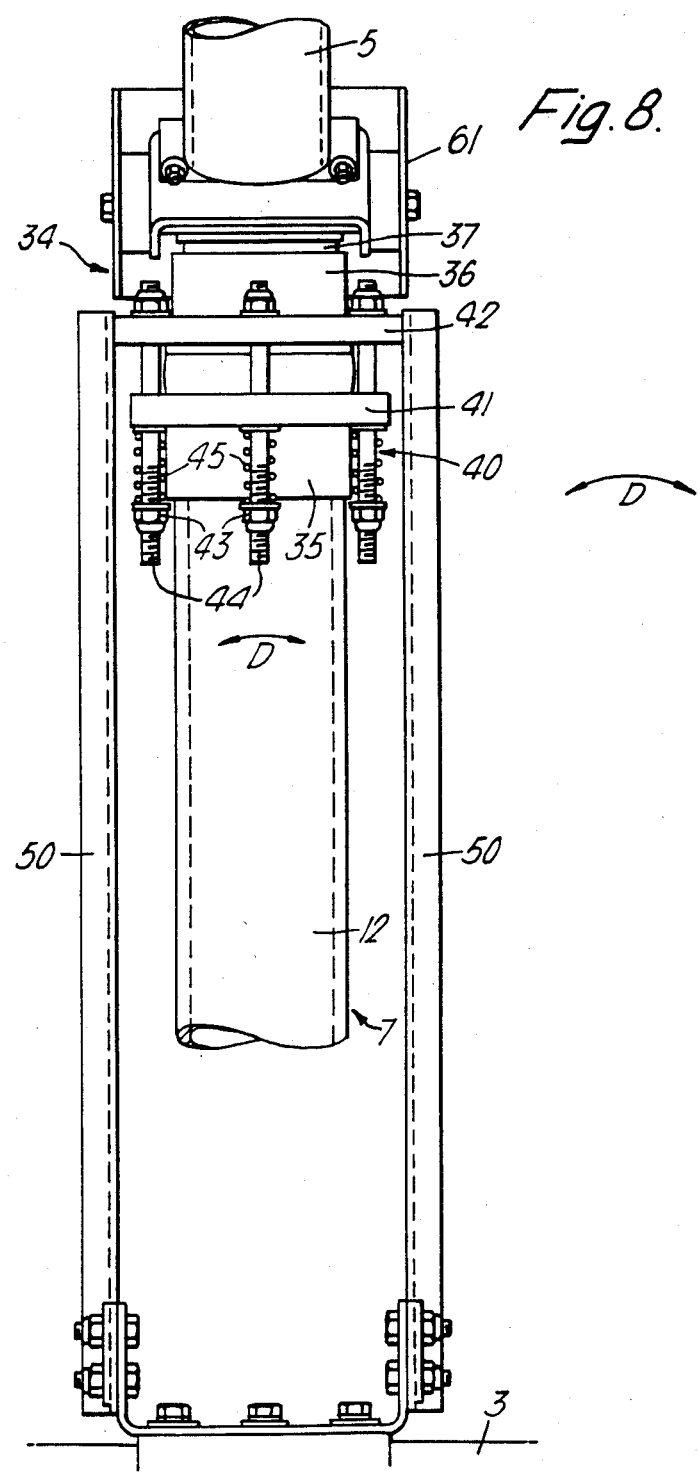

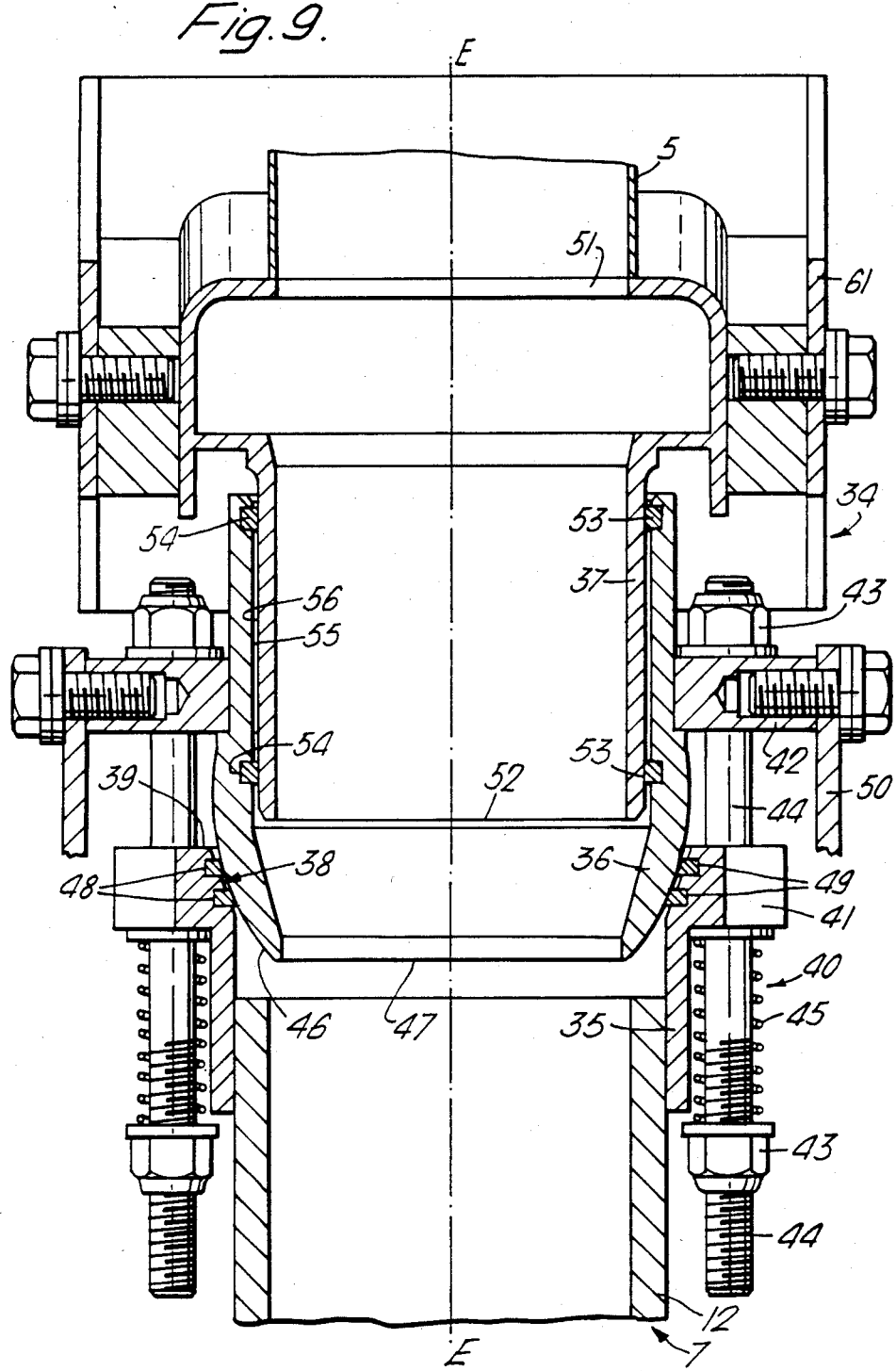

EXHAUST PIPE SYSTEM

TECHNICAL FIELD

This invention relates to an exhaust pipe system for an articulated motor vehicle comprising at least two parts which can pivot relative to one another. This invention has particular, though not exclusive, application for articulated dump trucks.

BACKGROUND OF THE INVENTION

Articulated dump trucks comprise a front part (tractor) including an internal combustion engine and drivers cab; and a rear part (trailer) including a pivotable body for holding the material to be moved; the front and rear parts being pivotable relative to one another. It is known, in such vehicles, to pass the exhaust gases from the engine through an exhaust pipe system across the pivot between the front and rear parts to suitable ducts in the body, the heat generated by the exhaust gases aiding the removal of sticky or frozen material from the body, when the body is pivoted to dump the material. Articulated dump trucks are susceptible, on occasion, to rolling over, usually with the rear part rolling over whilst the front part remains upright. On such an occasion, the exhaust pipe system is usually extensively damaged between the front and rear parts of the vehicle. This has the disadvantage of leaving the vehicle unusable until it is repaired, and leaving the vehicle requiring maintenance, both of which add considerably to the running costs of the vehicle. It may also require a stock of replacement components to be stored. One solution to this problem has been to include a long length of flexible tube in the exhaust pipe system between the front part and the rear part of the vehicle. This arrangement has the disadvantage of the problem raised by positioning and securing of the long flexible tube during normal operation of the vehicle.

SUMMARY OF THE INVENTION

The primary object of the present invention is to provide an exhaust pipe system for an articulated motor vehicle which overcomes the above mentioned disadvantages.

According to the present invention, in an exhaust pipe system for an articulated motor vehicle comprising at least a first part and a second part, the first and second parts being pivotable relative to one another, the exhaust pipe system comprises a first rigid portion securable to the first part of the vehicle; a second rigid portion securable to the second part of the vehicle; and an intermediate flexible portion connected at its ends to the rigid portions, the flexible portion comprising a coupling comprising two parts which are releasably secured together by fastening means to provide a substantially gas-tight seal between the two parts of the coupling, the fastening means being such that, when the two parts of the coupling are subjected to a force, relative to one another, above a predetermined level (for example, when one part of the vehicle rolls over relative to the other part of the vehicle), the fastening means is released allowing the two parts of the coupling to separate from one another without damaging any of the exhaust pipe system.

The exhaust pipe system of the present invention has the advantage that if one part of the vehicle does roll over relative to the other part of the vehicle, the two parts of the coupling simply separate from one another. Further, on righting the rolled-over part of the vehicle, the two parts of the coupling can be secured together again by the fastening means. This prevents damage to the exhaust pipe system, reduces the time the vehicle is left unusable, leaves the exhaust pipe system maintenance free, and eliminates the need to store, or wait for, spare parts. This invention also removes the requirement of installing a long length of flexible tube in the exhaust pipe system between the two parts of the vehicle.

The flexible portion of the exhaust pipe system preferably comprises a first flexible tube connected at one end to the first rigid portion of the exhaust pipe system and connected at the other end to one part of the coupling, and a second flexible tube connected at one end to the second rigid portion of the exhaust pipe system and connected at the other end to the other part of the coupling. Preferably each flexible tube is a single braid, stainless steel, flexible hose.

Each part of the coupling preferably comprises a flange member, one of the flange members having a circumferentially extending spigot locatable in a corresponding recess in the other flange member when the two parts of the coupling are secured together, the mated spigot and recess forming a substantially gas-tight seal between the two parts of the coupling. One or more sealing rings may also be positioned between the two parts of the coupling. Preferably one of the flange members has at least two, and preferably three, protruding pins which are locatable in corresponding holes in the other flange member when the two parts of the coupling are secured together.

The fastening means preferably comprises at least two, and preferably three, spring clips, each of which is secured to one part of the coupling and which comprises a handle pivotable about an axis at one end of the handle and a substantially U-shaped spring member comprising a spring strap extending between the arms of, and defining the base of, the U-shaped spring member for releasably engaging the other part of the coupling to secure the parts of the coupling together, the spring member being pivotably mounted on the handle at the free ends of its arms, the pivot axis of the spring member being substantially parallel to the pivot axis of the handle; nearer the free end of the handle than the pivot axis of the handle; and which, when the fastening means has secured the two parts of the coupling together, is nearer the said one part of the coupling than the pivot axis of the handle. In this case, the spring clips have an over-center locking mechanism. Preferably each arm of the U-shaped spring member includes a helical coil spring. Where each part of the coupling comprises a flange member, preferably the spring strap engages behind a face of the flange member of the said other part of the coupling which extends outwardly from the said other part. Further, in this case, where one of the flange members has protruding pins, preferably the protruding pins are mounted on said one part of the coupling each pin being positioned adjacent a spring clip, the arrangement being such that when the two parts of the coupling are secured together, each pin extends through its corresponding hole in the other flange member to protrude from the said face and the spring strap of each spring clip passes over its adjacent protruding pin to be located thereunder when each spring clip is releasably locked in position. The face is preferably at an angle, preferably at an angle of 5°, to a plan lying normal to the longitudinal axis of the coupling, to assist the release of the fastening means when the predetermined relative force is applied to the parts of the coupling.

The connection between the first rigid portion of the exhaust pipe system and the intermediate flexible portion preferably comprises a first spherical bearing which is capable of compensating for the relative pivotal movement, and for relative oscillatory movement, between the two parts of the vehicle during normal operation of the vehicle. Preferably the first spherical bearing comprises a first tubular member permanently attached to the flexible portion of the exhaust pipe system and having an internal surface of frustoconical shape at its free end; a second tubular member attached to the first tubular member by resilient means and having an external surface of truncated hemispherical shape at one end for partially mounting in the internal surface of the first tubular member, the maximum diameter of the external surface being greater than the maximum diameter of the internal surface, and at least one tapered sealing ring positioned between the external surface and internal surface, the resilient means biasing the first tubular member and second tubular member towards one another to form, with the tapered sealing ring, a substantially gas-tight seal between the first tubular member and the second tubular member but allowing limited (oscillatory) movement therebetween; and a third tubular member permanently attached to the first rigid portion of the exhaust pipe system and partially mounted in the second tubular member, but rotatable relative thereto about the longitudinal axis of the first spherical bearing, at least one sealing ring being positioned between the second tubular member and the third tubular member to form a substantially gas-tight seal therebetween. In this arrangement the second tubular member is preferably rigidly secured to the second part of the vehicle, and the third tubular member is preferably rigidly secured to the first part of the vehicle.

Preferably the connection between the second rigid portion of the exhaust pipe system and the intermediate flexible portion comprises a second spherical bearing comprising a first tubular member, a second tubular member, at least one tapered sealing ring therebetween, and resilient means which are substantially identical to the correspondingly named parts described above for the first spherical member. In this case, however, the second tubular member is permanently attached to the second rigid portion of the exhaust pipe system. With this arrangement, the second spherical bearing allows for other limited oscillatory movements between the first part and the second part of the vehicle.

DESCRIPTION OF PREFERRED EMBODIMENT

The invention is now described, by way of example, with reference to the accompanying drawings, in which:

FIGS. 4 and 5 are a cross-sectional and end view respectively of the second flexible tube and other part of the coupling of the exhaust pipe system shown in FIG. 1.

FIG. 8 is a front view of the support members of the exhaust pipe system in FIG. 1.

FIG. 9 is a cross-sectional view of the first spherical bearing of the exhaust pipe system in FIG. 1.

Figure 1:
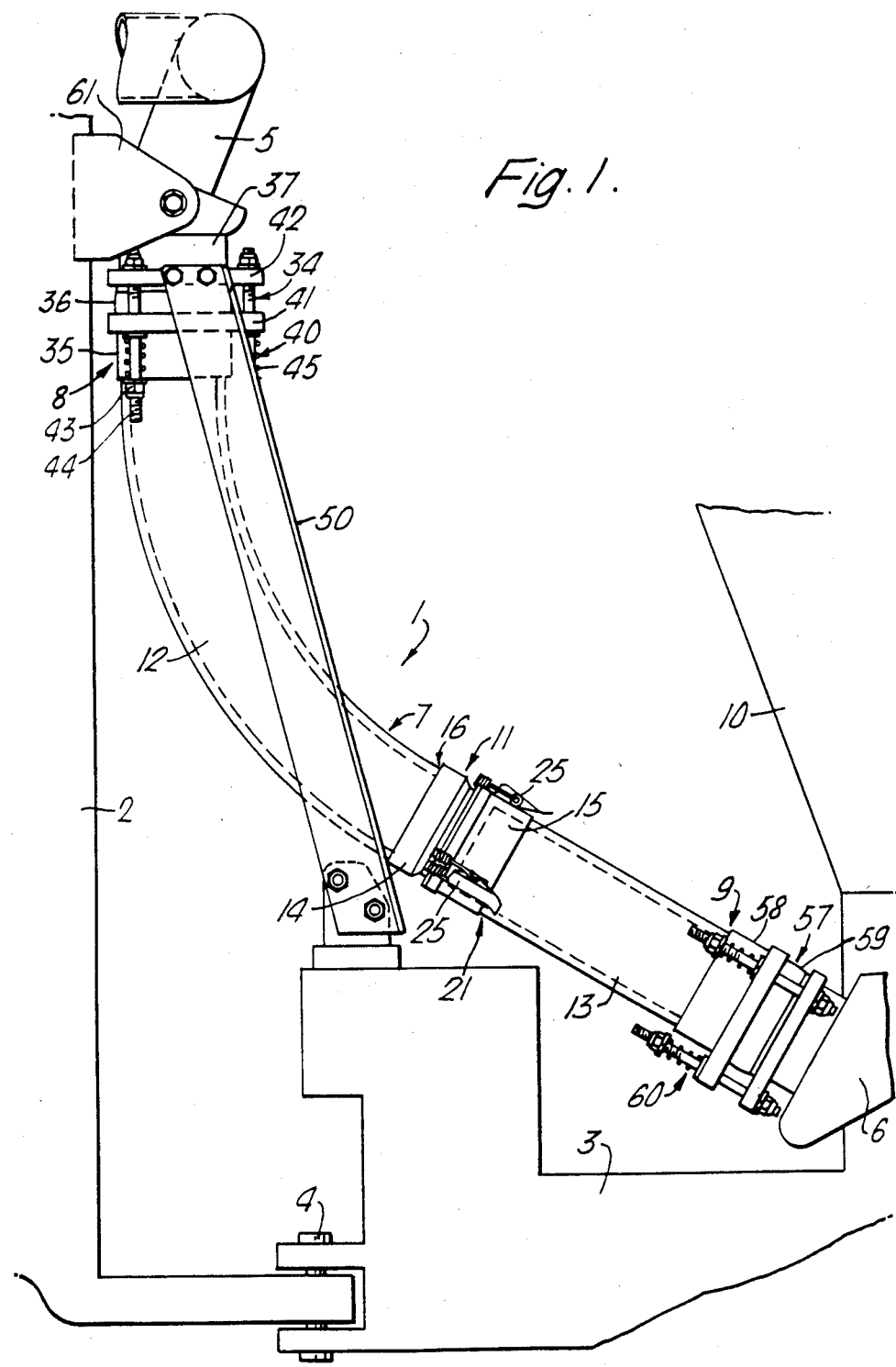
FIG. 1 is a side view of an exhaust pipe system in accordance with the present invention.
Figure 2:
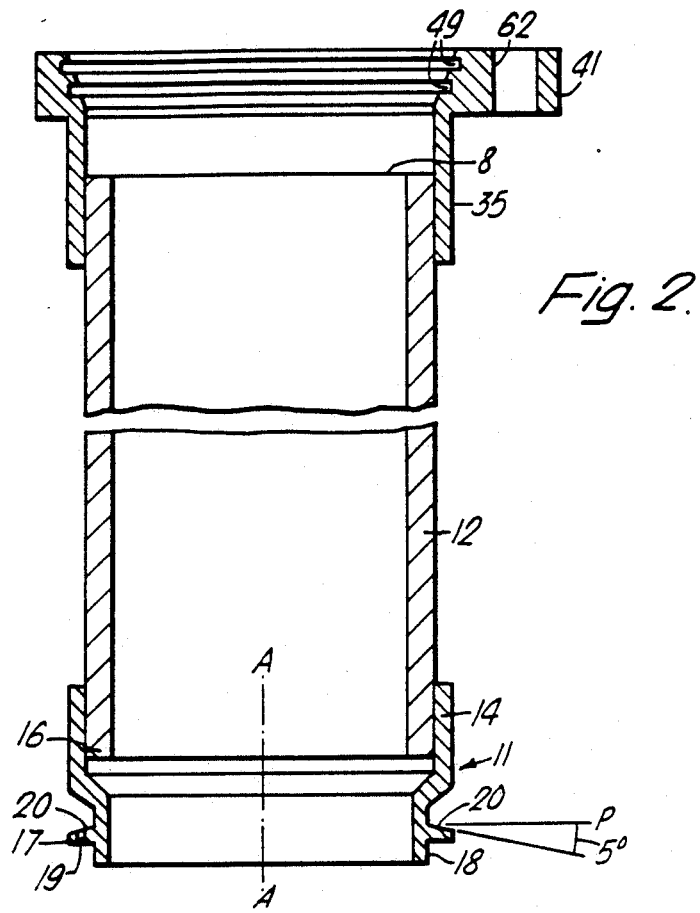
FIGS. 2 and 3 are a cross-sectional side and end view respectively of the first flexible tube and one part of the coupling of the exhaust pipe system shown in FIG. 1.
Figure 3:
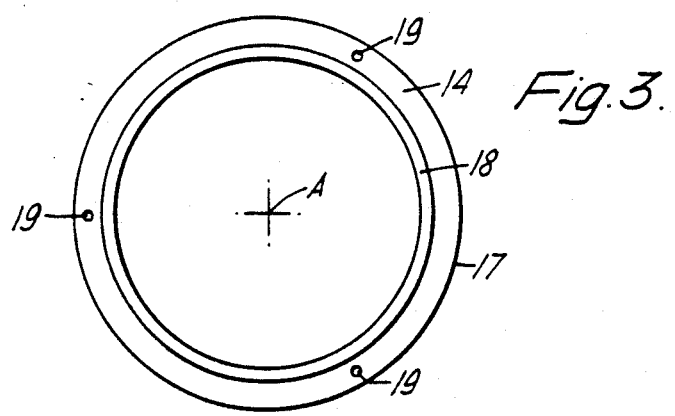
Figure 6:
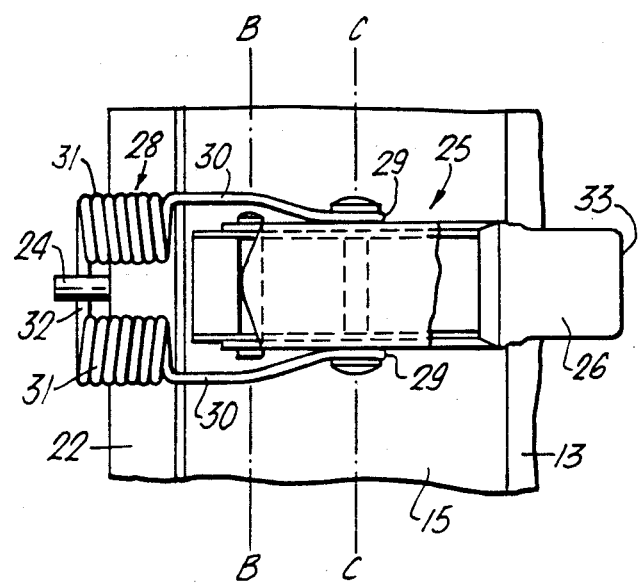
FIG. 6 is an enlarged view in the direction of arrow 6 in FIG. 4.

Referring to FIG. 1 of the drawings, an exhaust pipe system 1 is shown for an articulated motor vehicle comprising a front (first) part 2 and a rear (second) part 3 pivoted relative to one another at 4. The exhaust pipe system 1 comprises a first rigid portion 5 secured to the front part 2 of the articulated motor vehicle; a second rigid portion 6, in the form of an exhaust box, secured to the rear part 3 of the articulated motor vehicle; and an intermediate flexible portion 7 connected at its ends 8, 9 to the first and second rigid portions respectively. The front part 2 of the articulated motor vehicle contains an internal combustion engine (not shown) to which the first rigid portion 5 of the exhaust pipe system 1 is connected. The rear part 3 of the articulated motor vehicle includes a container body 10 which has ducts in its outer wall connected to the second rigid portion 6 of the exhaust pipe system 1 to allow exhaust gases to flow through the ducts and thereby heat the container body.

The intermediate flexible portion 7 includes a coupling 11, a first flexible tube 12, and a second flexible tube 13 which will now be explained in more detail with reference to FIGS. 2-6. The first flexible tube 12 is connected at one of its ends 8 to the first rigid portion 5, and the second flexible tube 13 is connected at one of its ends 9 to the second rigid portion 6. The means by which the connected is made will be described below. The coupling 11 comprises two parts 14, 15 which can be releasably secured together. Part 14 (FIGS. 2 and 3) is welded to the other end 16 of the first flexible tube 12 and comprises a flange member 17 having a circumferentially extending spigot 18, three pin locating holes 19 through the flange member and equidistantly spaced apart, and a face 20 on the opposite side of the flange member to the circumferentially extending spigot which is at an angle of approximately 5° to a plane P lying normal to the longitudinal axis A of the coupling. Part 15 (FIGS. 4-6) of the coupling 11 is welded to the other end 21 of the second flexible tube 13 and comprises a flange member 22 having a circumferentially extending recess 23, three protruding pins 24, equidistantly spaced apart, and a spring clip 25 positioned adjacent each protruding pin.

Each spring clip 25 includes a handle 26 which is pivotally mounted on one end 27 about an axis B, and a substantially U-shaped spring member 28. Each spring member 28 is pivotally mounted at the free ends 29 of its arms 30 about an axis C, and includes a helical coil spring 31 in each arm, and a spring strap 32 extending between the arms at the end remote from the free ends 29. The axis C is positioned nearer the free end 33 of the handle 26 than the axis B, and, when the handle is resting against the part 15 of the coupling 11 (the lock position), axis C is positioned nearer the second flexible tube 13 than the axis B. The spring clips 25 provide the fastening means to secure the two parts 14, 15 of the coupling 11 together, and, in this configuration, have an over-center locking mechanism. The holes 19 in flange member 17 are sized and positioned to receive the protruding pins 24 in flange member 22, the length of each protruding pin being greater than the length of the corresponding hole. The circumferentially extending recess 23 in flange member 22 is sized to receive the circumferentially extending spigot 18 of flange member 17 in a substantially gas-tight seal when the two parts 14, 15 of the coupling 11 are releasably secured together.

Figure 7:
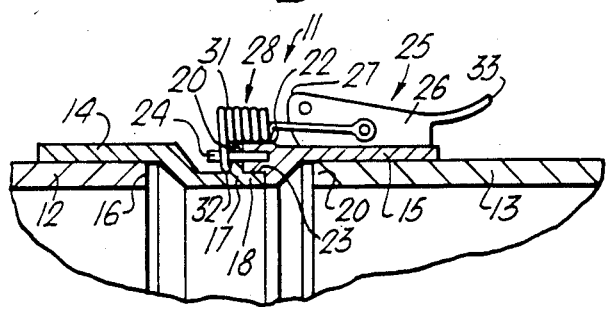
FIG. 7 is a partial cross-sectional view of the coupling shown in FIG. 1 adjacent a spring clip.

The two parts 14, 15 are releasably secured together by pivoting the handle 26 about its axis B such that the free end 33 of the handle moves away the second flexible tube 13. The two parts 14, 15 are then pushed together so that the circumferentially extending spigot 17 fully enters the circumferentially extending recess 23, and the protruding pins 24 pass through the pin receiving holes 19 to protrude from face 20. The spring strap 29 of each spring clip 25 is then positioned against the face 20 below its respective protruding pin 24, and the free end 33 of each handle 26 moved back towards the second flexible tube 13 until each handle rests against the part 15 of the coupling 11 and each spring strap 29 engages its respective protruding pin 24, thereby releasably securing the two parts 14, 15 together (FIG. 7).

This arrangement is such that once the two parts 14, 15 are secured together, they remain so during normal operation of the articulated motor vehicle. If, however, a force above a predetermined level is applied between the two parts 14, 15 (for example, when the rear part 3 of the articulated motor vehicle rolls over) the two parts 14, 15 of the coupling 11 will move away from one another, causing the protruding part of the protruding pins 24 to withdraw into their respective holes 19, thereby freeing the spring straps 32 from a positive retention. Each spring strap 32 then slides up the angled face 20 to release the spring clips 25 and thereby allowing rapid separation of the two parts 14, 15.

The connection between the end 8 of the first flexible tube 12 and the first rigid portion 5 comprises a first spherical bearing 34. The first spherical bearing 34 comprises three tubular member 35, 36, 37. The first tubular member (FIG. 9) is welded to the end 8 of the first flexible tube 12 and has an internal surface 38 of frustoconical shape at its free end 39. The second tubular member 36 is attached to the first tubular member 35 by resilient means 40 comprising two metal rings 41, 42, three threaded nuts 43 and studs 44, and three coil springs 45. Metal ring 41 is integral with the first tubular member 35, and metal ring 42 is welded to the second tubular member 36. The studs 44 pass through apertures 62 (FIG. 2) in the metal rings 41, 42, are equidistantly spaced apart, and have nuts 43 threaded on each end. A coil spring 45 is positioned about each stud 44 between metal ring 41 and the adjacent nut 43. The second tubular member 36 has an external surface 46 of truncated hemispherical shape at one end 47 which is shaped and sized to partially fit into the internal surface 38 of the first tubular member. Two tapered sealing rings 48 are positioned in grooves 49 in the internal surface 38 and engage the external surface 46. Metal ring 42 is also rigidly secured by support members 50 (FIG. 8) to the rear part 3 of the articulated motor vehicle. By suitable adjustment of the nuts 43 relative to the studs 44, the tension applied by the coil springs 45 to move the first tubular member 35 towards the second tubular member 36 can be adjusted, thereby providing the resilient means 40 for attaching the second tubular member to the first tubular member. The tension applied by the coil springs 45 is set such that a substantially gas-tight seal is formed by the tapered sealing rings 48 between the first tubular member 35 and the second tubular member 36, and such as to allow for limited oscillatory movement in the direction indicated by arrows D between the first tubular member 35 and second tubular member 36. The third tubular member 37 is rigidly secured to the front part 2 of the articulated motor vehicle by a support bracket 61, and is clamped (not shown) at one end 51 to the first rigid portion 5 of the exhaust pipe system. The other end 52 of the third tubular member 37 is positioned inside the second tubular member 36. Two sealing rings 53 are positioned in grooves 54 in the inner surface 55 of the second tubular member 36 which contact the external surface 56 of the third tubular member 37. This arrangement is such that a substantially gas-tight seal is formed between the second tubular member 36 and third tubular member 37, and such that limited rotational movement is allowed between the second tubular member 36 and the third tubular member 37 about the longitudinal axis E of the first spherical bearing 34. In this arrangement, the first spherical bearing 34 provides compensation for the relative pivotal movement (about pivot 4), and for relative oscillatory movement (in direction D), between the front part 2 and rear part 3 of the articulated motor vehicle.

The connection between the end 9 of the second flexible tube 13 and the second rigid portion 6 is made by a second spherical bearing 57. The second spherical bearing 57 comprises two tubular members 58, 59 which are substantially identical to the first and second tubular members 35, 36 respectively of the first spherical bearing 34; and resilient means 60 which is substantially identical to resilient means 40. In this case, tubular member 58 is welded to the end 9 of the second flexible tube 13, and tubular member 59 is permanently attached to the second rigid portion 6. Tapered sealing rings (not shown) are positioned between the tubular members 58, 59 in the same way as the tapered sealing rings 48 in the first spherical bearing 34. In this case, the second spherical bearing 57 allows for other limited oscillatory movements between the front part 2 and the rear part 3 of the articulated motor vehicle.

The present invention therefore provides an exhaust pipe system for an articulated motor vehicle which has an intermediate flexible portion between the rigid portions of the exhaust pipe system attached to each part of the vehicle, the flexible portion including a coupling comprising two parts which are releasably secured together an which separate when a force above a predetermined level is applied between them. The force is usually a combination of both axial tensile force and bending about the coupling. The arrangement is such that the two parts of the coupling are secured together with a substantially gas-tight seal during normal operation of the vehicle, but will separate if one part of the vehicle rolls over. The coupling described in the above preferred embodiment has the added advantages that on separation of the parts of the coupling, no excessive strain is applied to other parts of the exhaust pipe system, thereby avoiding fatigue and/or damage, and that there are no loose parats which could otherwise be lost on separation.

The embodiments of the invention in which an exclusive property or privilege is claimed are defined as follows:

1. An exhaust pipe system for an articulated motor vehicle comprising at least a first part and a second part, the first and second parts being pivotable relative to one another, the exhaust pipe system comprising a first rigid portion securable to the first part of the vehicle; a second rigid portion securable to the second part of the vehicle; and an intermediate flexible portion connected at its ends to the rigid portions, the flexible portion comprising a coupling comprising two parts which are releasably secured together by fastening means to provide a substantially gas-tight seal between the two parts of the coupling, the fastening means being such that, when the two parts of the coupling are subjected to a force, relative to one another, above a predetermined level, the fastening means is released allowing the two parts of the coupling to separate from one another without damaging any of the exhaust pipe system, each part of the coupling comprising a flange member, one of the flange members having a circumferentially extending spigot locatable in a corresponding recess in the other flange member when the two parts of the coupling are secured together, the mated spigot and recess forming a substantially gas-tight seal between the two parts of the coupling, and one of the flange members having at least two protruding pins which are locatable in corresponding holes in the other flange member when the two parts of the coupling are secured together.

2. An exhaust pipe system as claimed in claim 1, wherein the fastening means comprises at least two spring clips, each of which is secured to one part of the coupling and which comprises a handle pivotable about an axis at one end of the handle and a substantially U-shaped spring member comprising a spring strap extending between the arms of, and defining the base of, the U-shaped spring member for releasably engaging the other part of the coupling to secure the parts of the coupling together, the spring member being pivotably mounted on the handle at the free ends of its arms, the pivot axis of the spring member being substantially parallel to the pivot axis of the handle; nearer the free end of the handle than the pivot axis of the handle; and which, when the fastening means has secured the two parts of the coupling together, is nearer the said one part of the coupling than the pivot axis of the handle.

3. An exhaust pipe system as claimed in claim 2, wherein each arm of the U-shaped spring member includes a helical coil spring.

4. An exhaust pipe system as claimed in claim 2 in which each part of the coupling comprises a flange member, wherein the spring strap engages behind a face of the flange member of the said other part of the coupling which extends outwardly from the said other part.

5. An exhaust pipe system as claimed in claim 3 in which one of the flange members has protruding pins, wherein the protruding pins are mounted on said one part of the coupling each pin being positioned adjacent a spring clip, the arrangement being such that when the two parts of the coupling are secured together, each pin extends through its corresponding hole in the other flange member to protrude from the said face and the spring strap of each sprang clip passes over its adjacent protruding pin to be located thereunder when each spring clip is releasably locked in position.

6. An exhaust pipe system as claimed in claim 4, wherein the face is at an angle to a plane lying normal to the longitudinal axis of the coupling.

* * * * *